(12) United States Patent
Jo

(10) Patent No.: US 8,933,573 B2
(45) Date of Patent: Jan. 13, 2015

(54) WAVE POWER GENERATOR WITH RAFT VESSEL FOR GENERATING ENERGY

(76) Inventor: Chang-Hui Jo, Goyang-si (KR)

( * ) Notice: Subject to any disclaimer, the term of this patent is extended or adjusted under 35 U.S.C. 154(b) by 76 days.

(21) Appl. No.: 13/811,019

(22) PCT Filed: Jun. 23, 2011

(86) PCT No.: PCT/KR2011/004588
§ 371 (c)(1),
(2), (4) Date: Jan. 18, 2013

(87) PCT Pub. No.: WO2012/011674
PCT Pub. Date: Jan. 26, 2012

(65) Prior Publication Data
US 2013/0119668 A1    May 16, 2013

(30) Foreign Application Priority Data

Jul. 20, 2010   (KR) .................. 10-2010-0069947

(51) Int. Cl.
*F03B 13/22*        (2006.01)
*F03B 13/20*        (2006.01)

(52) U.S. Cl.
CPC ............... *F03B 13/22* (2013.01); *F03B 13/20* (2013.01); *Y02E 10/38* (2013.01)
USPC ........................................................ 290/53

(58) Field of Classification Search
CPC ......... F03B 13/16; F03B 13/20; Y02E 10/28; Y02E 10/38
USPC ..................................... 290/42, 53
See application file for complete search history.

(56) References Cited

U.S. PATENT DOCUMENTS

| 4,207,739 | A | | 6/1980 | Scarpi | |
|---|---|---|---|---|---|
| 5,909,060 | A | * | 6/1999 | Gardner | 290/53 |
| 8,129,854 | B2 | * | 3/2012 | Patten | 290/53 |
| 8,359,855 | B1 | * | 1/2013 | Fagan | 290/53 |
| 8,624,417 | B2 | * | 1/2014 | Song | 290/53 |

(Continued)

FOREIGN PATENT DOCUMENTS

| JP | 58-067970 A | 4/1983 |
|---|---|---|
| JP | 59-93672 | 6/1984 |

(Continued)

OTHER PUBLICATIONS

International Search Report mailed Dec. 20, 2011, issued in counterpart International Patent Application No. PCT/KR2011/004588; 5 pages including English translation.

*Primary Examiner* — Tho D Ta
(74) *Attorney, Agent, or Firm* — NSIP Law

(57) ABSTRACT

The present invention relates to a wave power generator, and more specifically, to a wave power generator that can promote more aggressive investment and research activities by overcoming the uncertainties of natural environment through the relatively high energy conversion efficiency thereof, and enhance the practicality and the value thereof as a clean energy source by increasing the investment-to-efficiency rate. To this end, the present invention comprises: one or more raft vessels, each having in a central point thereof a node that moves freely according to wave height and leads a flow of fluid inside of the raft vessel with a constant water level; and an energy generating unit connected in series to a vertical axis C on a cross section of the node of each raft vessel and configured to generate energy using kinetic energy of the raft vessel.

12 Claims, 7 Drawing Sheets

(56) References Cited

U.S. PATENT DOCUMENTS

2010/0171313 A1* 7/2010 Cook .............................. 290/53
2011/0031747 A1* 2/2011 Cho et al. ...................... 290/42

FOREIGN PATENT DOCUMENTS

| KR | 10-2010-0088786 A | 8/2010 |
| WO | WO 93/15315 A1 | 8/1993 |

* cited by examiner (a)

(b)

(c)

WAVE POWER GENERATOR WITH RAFT VESSEL FOR GENERATING ENERGY

The present patent application is the National Stage of International Application No. PCT/KR2011/004588, filed Jun. 23, 2011, which claims the benefit of Korean Patent Application No. 10-2010-0069947, filed on Jul. 20, 2010, in the Korean Intellectual Property Office, the disclosures of which are incorporated herein in their entirety by reference.

BACKGROUND

1. Field

Considering the present invention of clean energy generation from wave power, for encouraging active investment and research activities to the wave power generator, power generation system is to have relatively high conversion efficiency from wave energy and complementing irregular output from uncertainty of environment by nature, and to enhance the practicality and the value thereof as a clean energy resource, especially by virtue of the improved return on investment thereof.

2. Description of the Related Art

Our future is being threatened by exhaustion of fossil fuel resources, increasing cost pressure of energy due to reduced production and cost advancing pressure from oil-producing countries, and serious environmental pollution coming out from energy consumption.

In addition, conventional power generation system using fossil fuels, there are various power generation systems using various kinds of energy resources such as nuclear energy, tidal energy, water energy, wind energy, solar energy, bio energy, and so on.

However, nuclear energy even having economic feasibility has been restrictively developed only in some countries due to the Nuclear Nonproliferation Treaty and radioactive contamination, meanwhile water energy and tidal energy require proper site location satisfying system requirements, anticipated excessive investment and long-term construction period, while solar energy and wind energy require storage cell due to intermittent generation and higher cost.

Accordingly, development of wave power generation system using clean energy is still needed.

Considering those systems consuming fossil fuels, future-oriented new power generation systems using clean energy resources must be competitive in construction costs and operation cost to the conventional electric power systems including land occupations, anticipative investments, construction periods, social costs from environmental pollution, and so on. In addition, the wave power generation system must have high annual operation rate and be free from expensive storage equipment or auxiliary power generation.

Meanwhile, since water having heavier mass has higher kinetic energy than air having lighter mass the technology converting kinetic energy of moving seawater, i.e., research of generating electricity from wave power is now in advance.

In particular, considering that most countries have long coastal lines faced to ocean, energy resources from sea wave are out of count. However, frequency and wave power in near shore and offshore have high fluctuations according to environment of the locations and seasons, whereas relatively lower wave height often occurs according to season's weather condition.

Accordingly, if the disadvantage of practice caused by lower wave height and uneven wave period could be eliminated, uncountable wave power will be secured at no cost.

Technologies of converting wave power into energy have been opened already as an oscillating water column type, a movable body type (including a raft type), a raft conversion type, a shoulder cam type, an energy amplification and concentration type and air turbine type.

The oscillating water column type is most commonly used, but has a number of drawbacks. For example, the oscillating water column type takes long time to construct a large-scale bottom structure and uses inefficient air turbine, leading to cost ineffectiveness and necessarily changing output power due to a change in atmospheric pressure. In the case of the raft conversion type, an oil pressure pump with relatively less number of strokes is cost-ineffective and considered unsafe, so that it is no more a thing of interest. Both the oscillating water column type and the raft conversion type are available to generate power only when a wave height reaches a certain level. In addition, both of them are not efficient in energy conversion, and are adapted in a small range of usable wave.

As a raft is the most adequate medium to convert wave energy into useful energy, using mass movement of the raft, so that the raft conversion type may be the most promising method to generate power using wave energy. However, there are still many issues blocking the development of the raft conversion type, including low efficiency of the conversion type, variability of seasonal output power, concerns over stability against an abnormal wave and a gap in expenses between wave power generation and fossil-fuel power generation. Therefore, more researches and development need to be done to address the above troubling problems.

SUMMARY

The following description relates to providing a wave power generator which has a relatively high energy conversion efficiency with an increased investment-to-efficiency rate, so that the practicality and value of wave may be improved as a clean energy source.

The above objectives may be achieved by a wave power generator including one or more raft vessels, each having in a central point thereof a node that moves freely according to wave height and leads a flow of fluid inside of the raft vessel with a constant water level; and an energy generating unit connected in series to a vertical axis C on a cross section of the node of each raft vessel and configured to generate energy using kinetic energy of the raft vessel.

At this time, the wave power generator may further include an air balance tank configured to connect an end of the first raft vessel and an end of a second raft vessel, each raft vessel constituting the one or more raft vessels, spaced apart from one another and connected to each other; connection lines configured to connect the air balance tank to the first raft vessel and the second raft vessel; an air compressor connected to the air balance tank; and a controller configured to control internal air pressure of the air balance tank via the air compressor.

The air balance tank may be a convex U-type tank.

The raft vessel further may include a piezoelectric element for generation of electricity at one end thereof.

The raft vessel may have a length which is half a wave cycle and a height which is two times higher than a wave height, and wetted parts inside of the raft vessel may be coated or treated with less-resistant laminated surface.

The energy generating unit may include a gear box, a multipolar generator and a cross-flow water turbine with a sirocco fan, with the latter directly connected to the vertical axis C on the cross section of the node of the raft vessel.

The wave power generator may further include guide walls formed in surroundings of the cross-flow water turbine to guide fluid flowing into the water turbine.

Other features and aspects will be apparent from the following detailed description, the drawings, and the claims.

Figure 1:
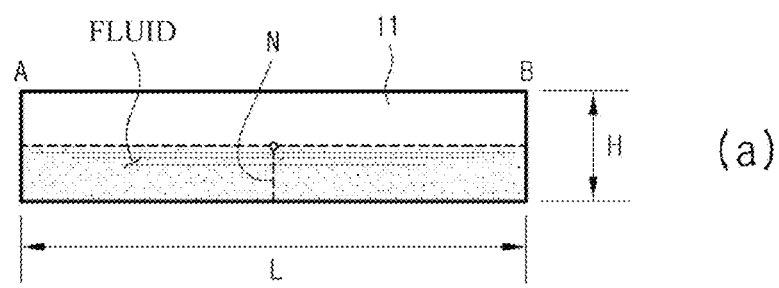
FIG. 1 is a diagram illustrating movement of a raft vessel on a sea wave and movement of fluid inside of the raft vessel according to an exemplary embodiment of the present invention.
Figure 1:
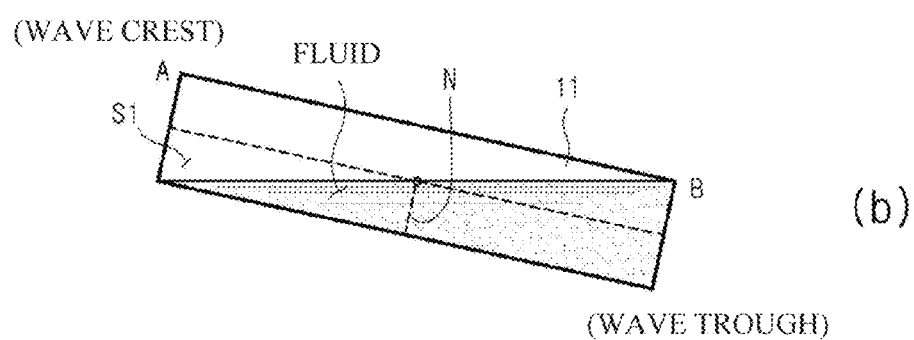
Figure 1:
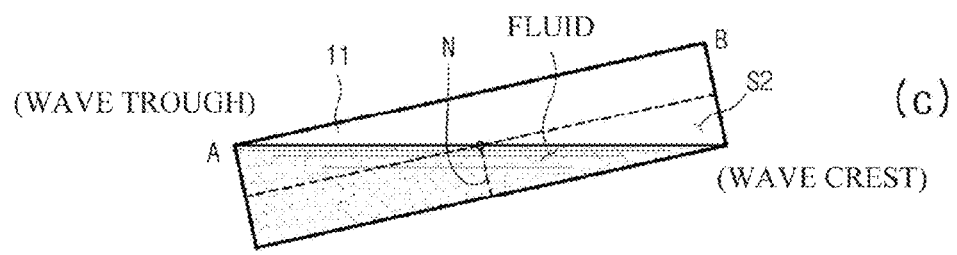

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 2:
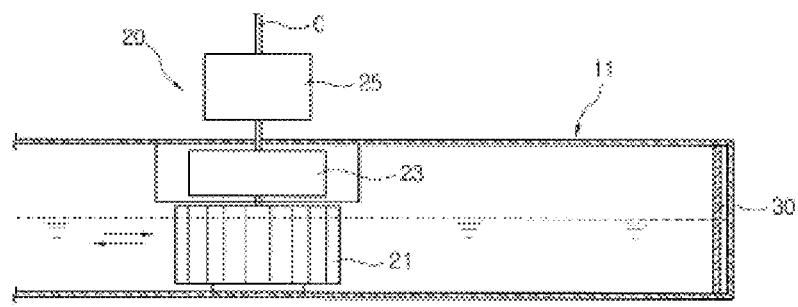
FIG. 2 is a schematic cross-sectional view of a generating system.
Figure 3:
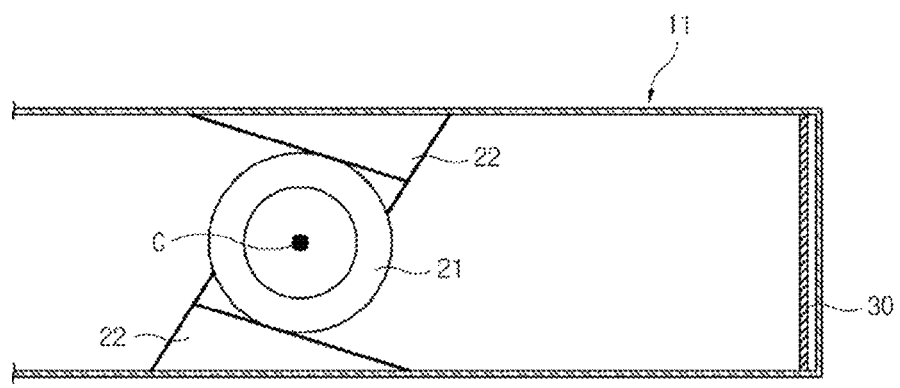
FIG. 3 is a plan view of FIG. 2.
Figure 4:
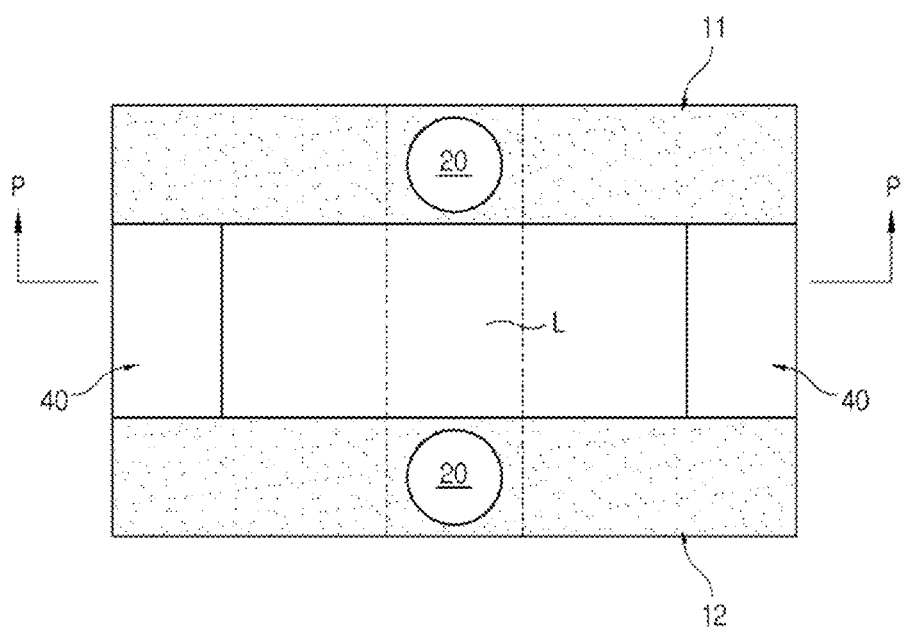
FIG. 4 is a conceptual plan view illustrating an air balance tank.
Figure 5:
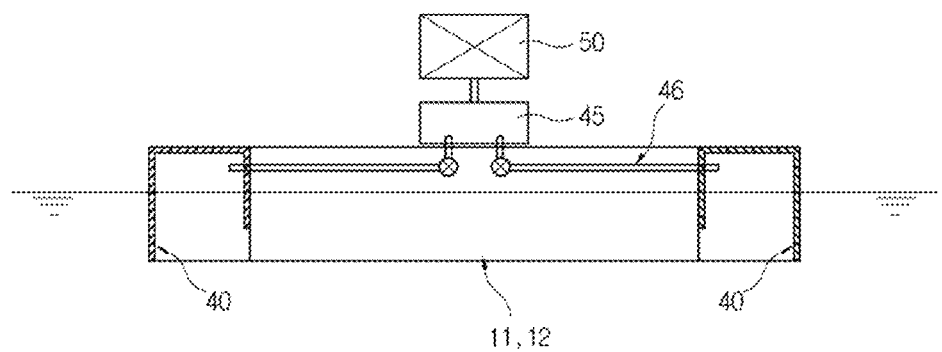
FIG. 5 is a P-P line cross-sectional view of FIG. 4.
Figure 6:
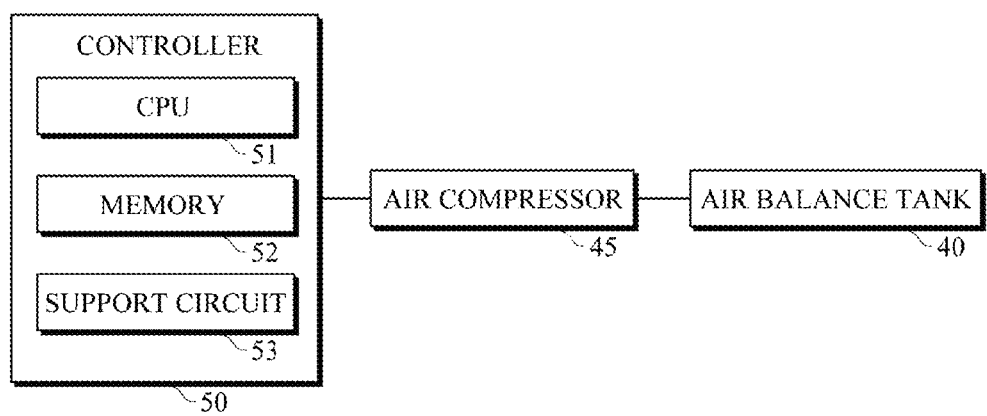
FIG. 6 is a block diagram illustrating a method for controlling a wave power generator according to an exemplary embodiment of the present invention.
Figure 7:
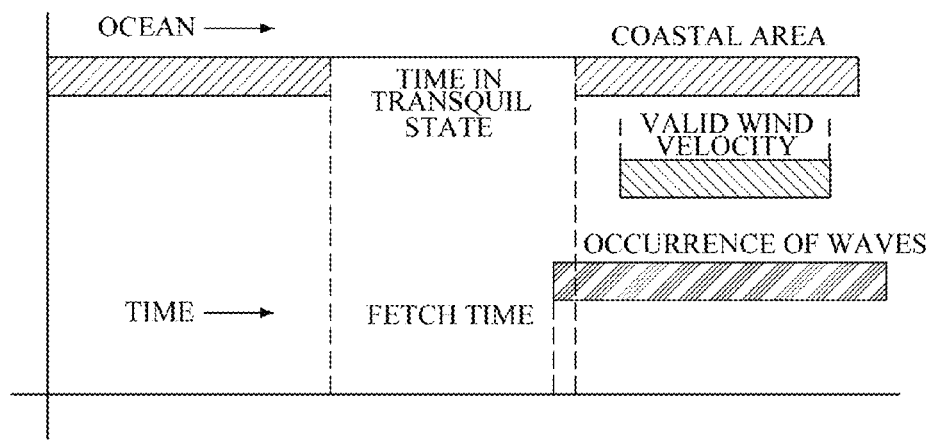
FIG. 7 is a comparative diagram illustrating comparison of transferring wind power energy and wave power energy.

FIG. 1 is a diagram illustrating movement of a raft vessel on a sea wave and movement of fluid inside of the raft vessel according to an exemplary embodiment of the present invention; FIG. 2 is a schematic cross-sectional view illustrating a generating system; FIG. 3 is a plan view of FIG. 2; FIG. 4 is a conceptual plan view of an air balance tank; FIG. 5 is a P-P line cross sectional view of FIG. 4; FIG. 6 is a block diagram illustrating a method for controlling a wave power generator according to an exemplary embodiment of the present invention; and FIG. 7 is a comparative diagram illustrating comparison transferring wind power energy and wave power energy, respectively.

The present invention is provided under a condition that water holds 800 times greater energy than air since the mass of water is greater than that of air.

A general consensus is that using a flow of fluid (water) in a raft vessel 11 is more effective than using air vibration in order to convert wave power into useful energy, and the present invention is based on the general consensus.

Kinetic energy (p) of fluid is acquired using the following [Equation 1].

$$P(W) = \tfrac{1}{2}\rho A V^3 \qquad \text{[Equation 1]}$$

P: Kinetic Energy of Fluid
ρ: Density of Fluid
A: Flow Cross Section of Fluid
V: Flow Velocity FIG. 1 is a diagram illustrating movement of a raft vessel on a sea wave and movement of fluid inside of the raft vessel. In FIG. 1, (a) indicates a tranquil state without a waveform, (b) shows a state with a waveform tilted upward to the left, and (c) points out a state with a waveform tilted upward to the right.

Referring to FIG. 1, if fluid, that is, water, fills only half the raft vessel 11, to control mass of the raft vessel 11, the fluid moves according to displacement movement of the raft vessel 11 led by a waveform, as shown in FIG. 1.

In this case, a central part of the raft vessel 11 is a node N or a node axis N with constant water level. On the basis of the node N, reciprocating movement of water occurs according to displacement movement of the raft vessel 11 led by a waveform. That is, when two ends A and B of the raft vessel 11 moves from locations shown in (a) of FIG. 1 to locations shown in (b) or (c) of FIG. 1, fluid inside of the raft vessel 11 moves along together. In other words, when the fluid of the raft vessel moves from (a) of FIG. 1 to (b) or (c) in FIG. 1, the fluid volume S1 is the same as the fluid volume S2 with constant water level.

In the case where the raft vessel 11 has a length L which is half a wave cycle and a height H which is two times higher than a wave height, water inside of the raft vessel 11 may flow most effectively.

Theoretically, energy of flowing water is proportional to the cubed value of a flow velocity of the water as shown in the above [Equation 1]. In addition, the steeper inclination of a flow cross section of water, the faster a flow velocity of water is Specifically, while an inclination angle of the raft vessel 11 gradually changes according to a waveform and a wave cycle, water returns to a horizontal state at a faster rate, and thus, the flow velocity does not rapidly change at the location of the node N. Thus, the flow velocity is determined by a volume of water which moves to either end of the raft vessel 11 according to inclination of a wave form during a wave cycle.

However, a safety measure, such as conduction, is required, since fluid inside of the raft vessel 11 may change and preponderate a center of mass of the raft vessel 11 and increase an underwater depth of the raft vessel 11, increasing a value of an inclination angle of the raft vessel 11 to be greater than an inclination angle of a corresponding waveform.

However, such technical problems may be addressed if the raft vessel is provided with excessive buoyancy and an air balance tank 40 to both ends thereof, as described in the following. Specifically, the air balance tank 40 is designed, in response to an abnormal buoyancy of the raft vessel 11, to prevent emergence of one end of the raft vessel 11 having relatively less mass on water surface using an attractive force led by a negative force which occurs between water surface and the raft vessel 11 when the raft vessel 11 floats abnormally.

In addition, instability of the independent raft vessel 11 against an unexpected abnormal wave may be minimized by repellent force of a lever L (See, FIG. 4) connecting a plurality of the raft vessels 11. The connection technique of the lever L may be referred in Korean Patent Application No. 10-2009-0007890, invented by the same inventor of the present invention.

In conclusion, the most stable and effective energy conversion method may be installing water turbine 21 (as of today, a cross flow water turbine is known for the highest efficiency), which rotates at a location of the node N in one direction, regardless of in which direction water flows, in order to convert fluid energy of water into electrical energy, and then generating electrical power using a piezoelectric element 30 which is installed at one end of the raft vessel 11 with significant water pressure led by water crash energy and water level change with reference to FIGS. 2 and 3.

Again, referring to FIG. 1, as the raft vessel 11 becomes inclined due to a wave, water inside of the raft vessel 11 flows toward each end alternatively, according to a wave cycle based on the node N. As a result, a flow velocity V may be achieved on a cross section of the node N, and such flow velocity V is represented by [Equation 1] as below:

Flow Velocity (V)=Change Rate of Volume (dv)/Wave Cycle (s)/Cross Section of Node (a)     [Equation 2]

That is, wave power energy is transferred to become a flow of fluid inside of the raft vessel 11, so that the wave power energy is transformed into a flow velocity V on a flow path of a cross section a.

Meanwhile, as illustrated in FIG. 2, it is possible to generate output power by connecting an energy generating unit 20, which includes a water turbine 21, a gear box 23 and a multipolar generator 25, to a vertical axis C on a cross section of the node N of the raft vessel 11.

In addition, guide walls 22 may be prepared in surroundings of the water turbine 21 to guide fluid flowing into the water turbine 21 so as to improve efficiency of the water turbine 21. At this time, configuration, structure and an angle of the guide walls 22 are not limited as shown in FIG. 3, but may be determined through a hydrodynamic review and a miniature experiment. That is, claims of the present invention are not necessarily limited as shown in the schematic diagrams of FIGS. 2 and 3.

In addition, wetted parts of the raft vessel 11 may be coated or treated with a less-resistant laminated surface in order to streamline water flow.

As illustrated in FIGS. 4 and 5, a pair of raft vessels 11, that is, a first raft vessel 11 and a second raft vessel 12, is prepared and then connected to each other via the lever L. In addition, a convex U-type air balance tank 40 is installed to connect an end of the first raft vessel 11 to an end of the second raft vessel 12. Next, an air compressor 45 and a controller 50 in association with the air compressor 45 control internal air pressure of the air balance tank 40 so as to use the internal air pressure as excessive buoyancy. If the internal air pressure is reduced, a reduced air pressure may serve as ballast due to an attractive force led by a negative pressure. Ballast refers to water which fills a ballast tank to keep the balance of a ship.

At this time, a plurality of the air balance tanks 40 may be installed in parallel between the first and the second raft vessels 11 and 12. In this case, connection lines 46 connect each of the plurality of the air balance tanks 40 to the air compressor 45.

For your reference, when an upside-down bowl is put on water surface, it is hard to lift the bowl due to atmospheric pressure. That is, it is difficult to pick the bowl up the water surface because water attracts the bowl. The air balance tank 40 of the present invention is designed based on this principle. In the above example, the bowl may be picked up by filling inside of the bowl with air. Similarly, internal air pressure of the air balance tank 40 may be controlled by the air compressor 45 and the controller 50 in association with the air compressor 45.

The controller 50 includes a Central Processing Unit (CPU) 51, a memory 52 and a support circuit 53, as illustrated in FIG. 6.

The CPU 51 may be one of various computer processors which are able to be applied in industries in order to control a wave power generator of the present invention. The memory 52 interacts with an operation of the CPU 51. That is, the memory 52 is a readable recording medium and may be installed in a local or remote area. The memory 52 is at least one or more memories, such as a Random Access Memory (RAM), a Read Only Memory, a floppy disk, hard disk and arbitrary memory which is easy to handle and stores data in a digital form. In addition, the support circuit 53 interactively supports typical processor operations of the CPU 51. The support circuit 53 may include a cache, a power supply, a clock circuit, an input/output circuit and a sub-system.

For example, the memory 52 may store overall processes occurring in a wave power generator, especially a process to control air pressure of the air balance tank 40 in the air compressor 45. Typically, the memory 52 may store a software routine. The software routine may be stored and executed in another CPU (not illustrated). According to an exemplary embodiment of the present invention, the processes are executed by a software routine. However, at least some of the processes may be executed by hardware. As such, the processes of the present invention may be executed by software able to be implemented in a computer system, hardware such as an integrated circuit, or a combination of software and hardware.

For your reference, wind power is considered as an example comparable to wave power. Comparison of transferring wind power energy and wave power energy is provided with reference to FIG. 7.

Wind power energy has little to do with fetch distance and is determined by a wind velocity of an area where a wind turbine is installed. In addition, the wind power energy is not accumulated even though wind is generated for a long time, and, if there is no wind, the energy disappears.

On the other hand, in spite of occurring due to wind power, wave power is accumulated and transferred on a basis of particle movement of water according to fetch distance and time from an ocean. That is, as illustrated in FIG. 7, valid wind velocity does not necessarily lead to an occurrence of wave in coastal areas. For this reason, a valid operational time period of a wind turbine is shorter than a valid operational time period of a water turbine.

In conclusion, waves are generated by wind blowing on the ocean and transferred from a relatively remote area to a coastal area, so that the wave has greater energy and lasts for a longer period than wind blowing on a coastal area. Therefore, in the long run, making investment and efforts to develop a technology of wave power generation may be much more efficient and lucrative than those for wind power generation.

According to the above exemplary embodiments of the present invention, wave power generation is relatively efficient in energy conversion, so that active investment and research may be promoted by overcoming uncertainties of the nature. Most of all, with an increased investment-to-efficiency rate, the wave power may be expected to become a highly practical and valuable clean energy source.

Although not mentioned in the above exemplary embodiments of the present invention, the present invention may be used with a method disclosed in Korean Patent Application No. 10-2009-0007890 invented by the same inventor of the present invention. In this case, if the efficiency of a water turbine 21 increases, the most efficient, stable and cost-effective way to generate clean energy.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wave power generator comprising:
one or more raft vessels, each having in a central point thereof a node that moves freely according to wave height and leads a flow of fluid inside of the raft vessel with a constant fluid level;
an energy generating unit connected in series to a vertical axis on a cross section of the node of each raft vessel and configured to generate energy using kinetic energy of the flow of fluid in the raft vessel;
an air balance tank configured to connect an end of the first raft vessel and an end of a second raft vessel, each raft vessel constituting the one or more raft vessels, spaced apart from one another and connected to each other;
connection lines configured to connect the air balance tank to the first raft vessel and the second raft vessel;
an air compressor connected to the air balance tank via the connection lines; and
a controller configured to control internal air pressure of the air balance tank via the air compressor.

2. The wave power generator of claim 1, wherein the air balance tank is a convex U-type tank.

3. The wave power generator of claim 1, wherein the raft vessel further comprises a piezoelectric element for generation of electricity at one end thereof.

4. The wave power generator of claim 1, wherein the wetted parts inside of the raft vessel are coated or treated with a less-resistant laminated surface.

5. The wave power generator of claim 1, wherein the energy generating unit comprises a gear box, a multipolar generator and a cross-flow water turbine which has a shape of a sirocco fan, with the latter directly connected to the vertical axis on the cross section of the node of the raft vessel.

6. The wave power generator of claim 5, further comprising:
guide walls formed in surroundings of the cross-flow water turbine to guide fluid flowing into the water turbine.

7. A wave power generator comprising:
a raft vessel configured to float on a wave and to contain a fixed volume of liquid,
an energy generating apparatus configured to convert fluid energy of the liquid into electrical energy,
an air balance tank configured to connect an end of the raft vessel to another raft vessel through connection lines,
an air compressor connected to the air balance tank via the connection lines, and
a controller configured to control internal air pressure of the air balance tank via the air compressor.

8. The wave power generator of claim 7, wherein the air balance tank is a convex U-type tank.

9. The wave power generator of claim 7, further comprising a piezoelectric element for generation of electricity at an end of the raft vessel.

10. The wave power generator of claim 7, wherein parts inside of the raft vessel are coated or treated with a less-resistant laminated surface.

11. The wave power generator of claim 7, wherein the energy generating apparatus comprises a gear box, a multipolar generator and a cross-flow water turbine which has a shape of a sirocco fan.

12. The wave power generator of claim 11, further comprising:
guide walls formed in surroundings of the cross-flow water turbine to guide liquid flowing into the water turbine.

* * * * *